United States Patent
Kilibarda et al.

(10) Patent No.: US 9,821,473 B2
(45) Date of Patent: Nov. 21, 2017

(54) ROBOTIC SMART END EFFECTOR TOOLING

(71) Applicant: Comau, Inc., Southfield, MI (US)

(72) Inventors: Velibor Kilibarda, Birmingham, MI (US); Joseph Cyrek, Southfield, MI (US); David Reid, Commerce Township, MI (US)

(73) Assignee: Comau LLC, Southfield, MI (US)

( * ) Notice: Subject to any disclaimer, the term of this patent is extended or adjusted under 35 U.S.C. 154(b) by 488 days.

(21) Appl. No.: 14/527,098

(22) Filed: Oct. 29, 2014

(65) Prior Publication Data

US 2015/0088300 A1    Mar. 26, 2015

Related U.S. Application Data

(62) Division of application No. 12/689,993, filed on Jan. 19, 2010, now abandoned.
(Continued)

(51) Int. Cl.
| | | |
|---|---|---|
| B25J 15/04 | (2006.01) | |
| B05B 15/02 | (2006.01) | |

(Continued)

(52) U.S. Cl.
CPC ....... B25J 15/0483 (2013.01); B05B 15/0225 (2013.01); B05C 5/0216 (2013.01);
(Continued)

(58) Field of Classification Search
CPC ....... B25J 11/005–11/007; B25J 9/1015; B25J 15/0019; B25J 15/0052; B25J 15/0061; B25J 15/0066; B25J 15/04; B25J 15/0483; B23K 11/314; B23K 11/315; Y10S 901/02; Y10S 901/06; Y10S 901/08; Y10S 901/30–901/43; G05B 2219/31095;
(Continued)

(56) References Cited

U.S. PATENT DOCUMENTS

| | | |
|---|---|---|
| 4,461,407 A | 7/1984 | Finnegan |
| 4,512,709 A | 4/1985 | Hennekes et al. |

(Continued)

FOREIGN PATENT DOCUMENTS

| | | |
|---|---|---|
| EP | 0 924 034 A2 | 6/1999 |
| EP | 2525946 A2 | 11/2012 |

(Continued)

OTHER PUBLICATIONS

Notification of Transmittal of the International Search Report and the Written Opinion dated Oct. 19, 2010 from the corresponding International Application No. PCT/US2010/02756 filed on Mar. 10, 2010.

(Continued)

*Primary Examiner* — Spencer D Patton
(74) *Attorney, Agent, or Firm* — Young Basile Hanlon & MacFarlane, P.C.

(57) ABSTRACT

A robotic end effector system and method having a plurality of end effectors which are selectively suitable for particular applications on a workpiece. The end effectors include a resident controller adapted to execute tasks specific to the end effector and are rapidly attachable and removable from the robot for easy change over to different workpieces.

17 Claims, 10 Drawing Sheets

Related U.S. Application Data

(60) Provisional application No. 61/145,695, filed on Jan. 19, 2009, provisional application No. 61/160,893, filed on Mar. 17, 2009.

(51) Int. Cl.

| | | |
|---|---|---|
| *B05C 5/02* | (2006.01) | |
| *B05C 11/10* | (2006.01) | |
| *B05C 17/01* | (2006.01) | |
| *B23K 11/31* | (2006.01) | |
| *B25J 15/00* | (2006.01) | |
| *B25J 9/10* | (2006.01) | |
| *B25J 11/00* | (2006.01) | |

(52) U.S. Cl.
 CPC ...... *B05C 11/1005* (2013.01); *B05C 11/1021* (2013.01); *B05C 17/0143* (2013.01); *B23K 11/315* (2013.01); *B25J 9/10* (2013.01); *B25J 11/005* (2013.01); *B25J 15/0019* (2013.01); *B25J 15/04* (2013.01); *G05B 2219/31095* (2013.01); *G05B 2219/39468* (2013.01); *G05B 2219/49304* (2013.01); *G05B 2219/49305* (2013.01); *Y10S 901/02* (2013.01); *Y10S 901/41* (2013.01); *Y10S 901/42* (2013.01); *Y10T 29/49826* (2015.01); *Y10T 74/20335* (2015.01)

(58) Field of Classification Search
 CPC .......... G05B 2219/39468; G05B 2219/49304; G05B 2219/49305; G05B 2219/49303; G05B 2219/50338; G05B 2219/50255
 See application file for complete search history.

(56) References Cited

U.S. PATENT DOCUMENTS

| | | |
|---|---|---|
| 4,545,723 A | 10/1985 | Clark |
| 4,620,362 A | 11/1986 | Reynolds |
| 4,697,472 A | 10/1987 | Hiyane |
| 4,706,905 A | 11/1987 | Torres |
| 4,710,093 A | 12/1987 | Zimmer et al. |
| 4,784,421 A | 11/1988 | Alvite |
| 4,785,760 A | 11/1988 | Tholome |
| 4,905,398 A | 3/1990 | Botbyl |
| 4,974,752 A | 12/1990 | Sirek |
| 4,996,753 A | 3/1991 | Jones |
| 5,293,911 A | 3/1994 | Akeel |
| 5,437,207 A | 8/1995 | Zimmer |
| 5,454,869 A | 10/1995 | Roden |
| 5,468,099 A | 11/1995 | Wheetley et al. |
| 5,477,597 A | 12/1995 | Catania et al. |
| 5,482,189 A | 1/1996 | Dentler et al. |
| 5,535,498 A | 7/1996 | Roberts et al. |
| 5,586,391 A | 12/1996 | Micale |
| 5,624,364 A | 4/1997 | Zimmer |
| 5,711,697 A * | 1/1998 | Taninaga ............. B24B 27/04 318/560 |
| 5,779,609 A | 7/1998 | Cullen et al. |
| 5,880,956 A | 3/1999 | Graf |
| 6,073,326 A | 6/2000 | Banks et al. |
| 6,330,493 B1 | 12/2001 | Takahashi et al. |
| 6,349,884 B1 | 2/2002 | Thome et al. |
| 6,401,011 B1 | 6/2002 | Hashimukai |
| 6,419,426 B1 | 7/2002 | Chalupa et al. |
| 6,533,594 B1 | 3/2003 | Kurup |
| 6,556,891 B2 | 4/2003 | Hietmann et al. |
| 6,636,781 B1 | 10/2003 | Shen et al. |
| 6,644,897 B2 | 11/2003 | Martinez et al. |
| 6,742,722 B2 | 6/2004 | Hosoda et al. |
| 6,782,294 B2 | 8/2004 | Reich et al. |
| 6,804,580 B1 | 10/2004 | Stoddard et al. |
| 6,807,461 B2 | 10/2004 | Kneifel, II et al. |
| 6,843,328 B2 | 1/2005 | Boyl-Davis et al. |
| 6,949,057 B2 | 9/2005 | Everson et al. |
| 6,989,176 B2 | 1/2006 | Congard et al. |
| 6,995,536 B2 | 2/2006 | Challoner |
| 7,003,860 B2 | 2/2006 | Bloch et al. |
| 7,112,018 B2 | 9/2006 | Boyl-Davis et al. |
| 7,134,649 B2 | 11/2006 | Boyl-Davis et al. |
| 7,149,606 B2 | 12/2006 | Krause |
| 7,220,330 B2 | 5/2007 | Tubb et al. |
| 7,259,535 B1 | 8/2007 | Pastusak et al. |
| 7,321,808 B2 | 1/2008 | Nagamatsu |
| 7,330,777 B2 | 2/2008 | Hashimoto et al. |
| 7,343,222 B2 | 3/2008 | Solomon |
| 7,380,776 B2 | 6/2008 | Boyl-Davis et al. |
| 7,395,606 B2 | 7/2008 | Crampton |
| 7,452,196 B2 | 11/2008 | Khoshnevis |
| 7,488,144 B2 | 2/2009 | Boyl-Davis et al. |
| 7,578,642 B2 | 8/2009 | Fritsche et al. |
| 7,591,078 B2 | 9/2009 | Crampton |
| 7,677,181 B2 | 3/2010 | Boyl-Davis et al. |
| 7,779,716 B2 | 8/2010 | Dellach et al. |
| 7,954,218 B2 | 6/2011 | Tomchick et al. |
| 8,096,038 B2 | 1/2012 | Condliff |
| 8,666,546 B2 | 3/2014 | Sarh et al. |
| 8,668,410 B1 | 3/2014 | Arana et al. |
| 8,696,851 B2 | 4/2014 | Snyder et al. |
| 8,706,302 B2 | 4/2014 | Eickhorst |
| 8,751,046 B2 | 6/2014 | Hartmann et al. |
| 8,774,969 B2 | 7/2014 | Schreiber |
| 8,790,050 B2 | 7/2014 | Marguet et al. |
| 8,819,907 B2 | 9/2014 | Tomchick |
| 2002/0111702 A1 | 8/2002 | Angel |
| 2003/0014500 A1 | 1/2003 | Schleiss et al. |
| 2003/0095514 A1 | 5/2003 | Sabe et al. |
| 2004/0265076 A1 | 12/2004 | Buttrick, Jr. et al. |
| 2005/0065647 A1 * | 3/2005 | Perry ................... B25J 9/161 700/245 |
| 2005/0166413 A1 | 8/2005 | Crampton |
| 2005/0189435 A1 | 9/2005 | Kubota et al. |
| 2006/0023322 A1 * | 2/2006 | McNeal ............... G02C 11/08 359/819 |
| 2006/0088367 A1 | 4/2006 | Dellach et al. |
| 2006/0095169 A1 | 5/2006 | Minor et al. |
| 2006/0155865 A1 | 7/2006 | Brandt et al. |
| 2006/0217842 A1 | 9/2006 | Kobayashi et al. |
| 2006/0293788 A1 | 12/2006 | Pogodin |
| 2007/0019641 A1 | 1/2007 | Pai et al. |
| 2007/0067725 A1 | 3/2007 | Cahill et al. |
| 2007/0186010 A1 | 8/2007 | Hall et al. |
| 2008/0009969 A1 | 1/2008 | Bruemmer et al. |
| 2008/0082196 A1 | 4/2008 | Wiese et al. |
| 2008/0234861 A1 | 9/2008 | Fortell et al. |
| 2008/0235970 A1 * | 10/2008 | Crampton ............ B25J 13/088 33/503 |
| 2008/0269949 A1 | 10/2008 | Norman et al. |
| 2009/0018697 A1 | 1/2009 | Prat et al. |
| 2009/0043424 A1 | 2/2009 | Khoshnevis |
| 2009/0127279 A1 | 5/2009 | Zieve et al. |
| 2009/0216344 A1 | 8/2009 | Bretin |
| 2010/0115749 A1 | 5/2010 | Torres Martinez et al. |
| 2010/0180711 A1 | 7/2010 | Kilibarda et al. |
| 2010/0241260 A1 | 9/2010 | Kilibarda et al. |
| 2012/0210802 A1 | 8/2012 | Sarh et al. |
| 2013/0166071 A1 | 6/2013 | Kranz et al. |
| 2013/0274918 A1 | 10/2013 | Zurbau |
| 2013/0289766 A1 | 10/2013 | Hafenrichter et al. |
| 2013/0305868 A1 | 11/2013 | Liebl et al. |
| 2013/0310982 A1 | 11/2013 | Scheurer et al. |
| 2014/0115850 A1 | 5/2014 | Gamboa |
| 2014/0115894 A1 | 5/2014 | Gamboa |
| 2014/0182123 A1 | 7/2014 | Krejci |
| 2014/0199153 A1 | 7/2014 | Reinhold et al. |
| 2014/0263934 A1 | 9/2014 | Buttrick, Jr. |
| 2014/0305217 A1 | 10/2014 | Tapia et al. |

FOREIGN PATENT DOCUMENTS

| | | | |
|---|---|---|---|
| GB | 949150 A * | 2/1964 | ............. B23K 11/10 |
| GB | 2143800 A | 2/1985 | |
| JP | 11077575 A | 3/1999 | |

(56) References Cited

FOREIGN PATENT DOCUMENTS

| | | |
|---|---|---|
| JP | 2002315963 A | 10/2002 |
| JP | 2003127085 A | 5/2003 |
| JP | 2004017260 A | 1/2004 |
| KR | 10-2006-0015557 A | 2/2006 |
| WO | 2010107872 A2 | 9/2010 |
| WO | 2011094092 A2 | 8/2011 |

OTHER PUBLICATIONS

Extended European Search Report dated Nov. 11, 2012 in 10 pages for co-pending European Application No. 10754033.8 filed on Sep. 14, 2011.
Notification of Transmittal, International Search Report and Written Opinion dated Sep. 20, 2011 from the corresponding International Application No. PCT/US2011/021557 filed Jan. 18, 2011.
Supplementary European Search Report dated Jan. 29, 2014 from European Application No. 11737447.0 (corresponding to International Application No. PCT/US2011/021557 filed Jan. 18, 2011).
KR 10-2006-0015557, published Feb. 17, 2006, Applicant is Stephen James Crampton, 168 pages, (uploaded in three parts due to EPS size limits) English Abstract listed above.

\* cited by examiner

ROBOTIC SMART END EFFECTOR TOOLING

CROSS-REFERENCE TO RELATED APPLICATIONS

This application claims priority to U.S. application Ser. No. 12/689,993 filed Jan. 19, 2010, which claims priority to U.S. Provisional Application Ser. No. 61/145,695 filed Jan. 19, 2009 and U.S. Provisional Application Ser. No. 61/160,893 filed Mar. 17, 2009, all of which are incorporated herein by reference in their entirety.

BACKGROUND

The use of automated robots in manufacturing and assembly facilities has become commonplace for the efficient assembly of large and small, simple and complex devices and machines. One example of an application which has become more complex requiring the use and coordination of numerous robots is in the manufacture and assembly of automotive vehicles.

An assembly line in a manufacturing facility may include a fluid applying system for applying fluid, such as a bead of sealant or adhesive, to a workpiece. Other applications include clamping two or more pieces together to be transferred, welded or secured together. In a technologically advanced facility, one or more of these operations, and typically most of them, require the use of robots. In the past, such robots were typically set-up, tooled and programmed to carry out a specific task, for example, welding or adhering certain pieces together, application of fasteners used later in an assembly process or coating with paint or other material protectant. Once set-up and programmed, it was laborious and time consuming to change the robot tooling or programming to re-task the robot to function in a different capacity or application. This made it difficult, time consuming and costly to, for example, change from the manufacture and assembly of one vehicle type to another. Thus, one a robot was set-up and programmed, that robot was dedicated to that application and was not useful to use in other applications or tasks without substantial changeover time.

In one manufacturing and assembly application to provide fluid adhesive or sealant to a workpiece, for example a sheet metal vehicle body, typically such a fluid supply system includes a robot having a nozzle for applying fluid to the workpiece. The robot receives fluid from a fluid supply, such as one or more industrial sized drums of the fluid, disposed near the robot. A fluid supply line extends from at least one of the drums to the robot. The fluid supply line is often fixed to a ceiling or other support above the robot. An end of the fluid supply line coupled to the robot is typically a coiled line in order to prevent the fluid supply line from restricting movement of the robot, and the coiled line is in fluid communication with the robot. Such systems often required pumps and other capital equipment, sizable floor space and were very expensive. Further, changing from one fluid to another, for example to a different adhesive or sealant, required changing fluid lines and cleaning the existing line to comply with regulations and purity of the alternate fluid to be used. The robot can thus move the nozzle into an application position relative to the workpiece, and the nozzle can apply fluid to the workpiece. Additionally, other components, such as a pump and a control system, are typically necessary for operation of the system.

Similarly, other robotic applications such as metal-to-metal spot welding, application of weld studs, and automated clamping and component transferring systems suffered from the same disadvantages.

SUMMARY

A robotic end effector system and method is disclosed for use in the manufacturing and assembly of devices, for example, automotive sheet metal bodies and associated vehicle systems. The effector system allows a suitable robot to quickly change an end effector, for example an end effector used for applying an adhesive or sealant, to another end effector, for example a weld gun. The system and method substantially eliminates, or eliminates altogether, past restraints on dedicated robots for specific applications or tasks and provides for greatly increased flexibility of the robot to change tasks for more efficient use and efficient manufacturing and assembly as a whole.

The end effector system and method uses a connector and data communication links or means so that the end effector itself can include an on-board or on-effector controller to receive and/or execute programs specific to the type of effector in use by the robot. On a need to change the application of the robot, the end effector may be disconnected from the robot connector and a new or alternate effector or appliance can be picked-up or otherwise secured to the robot, communication re-established between the effector and the robot, or other communication equipment, and the robot is retasked to another application or use.

In an example of a fluid applying robot, for example the application of an adhesive or sealant, the end effector can include a receptacle for receiving and temporary holding of a canister of fluid. The robot, or preferably the end effector, can include a plunger or another structure for controlling the flow of fluid from the canister, and the robot can move the canister into a fluid applying position relative to the workpiece. With the canister in the fluid applying position, the plunger can be actuated to cause fluid to flow from the canister. When the canister is empty or a different fluid is required, the robot can maneuver to dispose of the canister and can obtain a new canister. In one example, the robot or end effector can include a blade or other cutting mechanism for removing a portion of an empty canister that contains any remaining fluid.

The example of an end effector described herein for applying a fluid applying robot as described herein can have many advantages over known fluid applying systems. For example, the fluid applying robot can cost an order of magnitude less than known fluid applying systems, at least in part because the fluid applying robot as described herein can be used without the complex fluid storage and transport components of known fluid applying systems. Further, the fluid applying robot can be much more versatile than known fluid applying systems, as the fluid applying robot can be more easily moved in order to reconfigure an assembly line since the fluid applying robot can be used without separate components, some of which may be fixed in place. Additionally, the fluid applying robot as described herein can also be more versatile than known fluid applying systems since changing the fluid applied by the fluid applying robot can be accomplished by the robot obtaining a new fluid canister. Finally, disposal of empty canisters can be less expensive than cleaning the fluid sources used by known fluid applying systems since the plunger of the fluid applying robot can remove almost all of the fluid from the canister such that the only portion of the canister that should be cleaned is the portion removed by the blade.

These advantages are also achievable with many other robotic end effectors including welding, for example changing the particular spot welding gun end effector to access and weld in a different area or applying a different weld stud or in a different location. An end effector which provides a holding or clamping fixture or function, may be quickly changed to clamp alternate components or in different areas.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
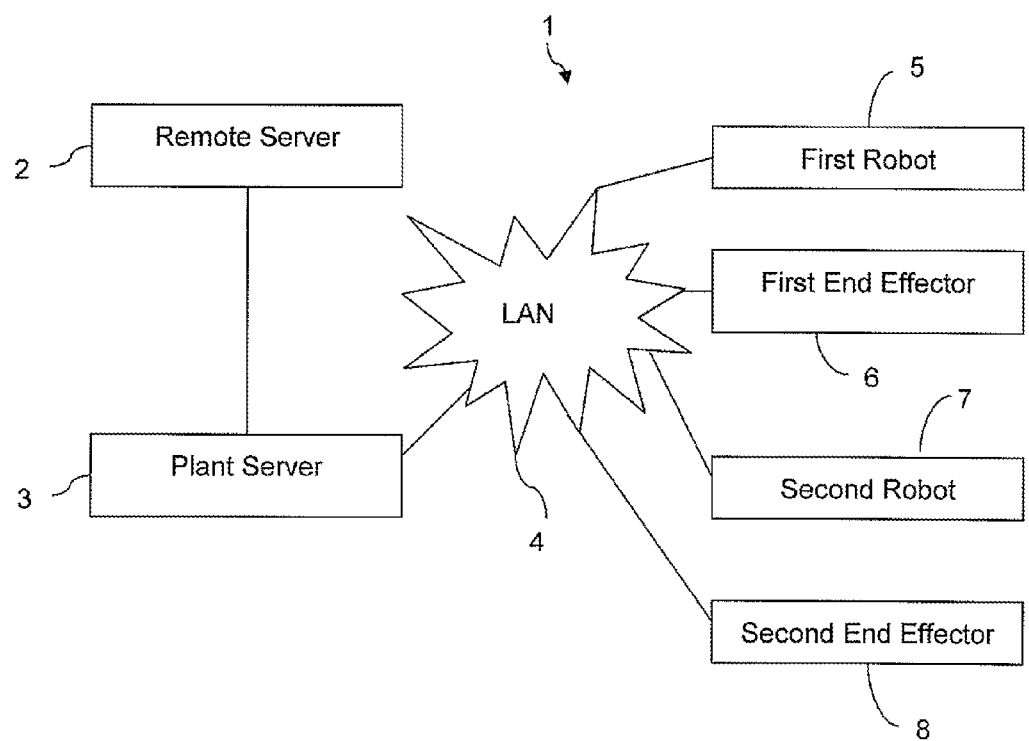
FIG. 1 is a simplified schematic of an industrial communication system.

Examples of industrial communication systems and industrial appliances are described herein with references to FIGS. 1-14. As shown in FIG. 1, an industrial communication system 1 can include a remote server 2 in communication with a plant server 3. The plant server 3 can be in communication via a local area network 4 with various industrial devices, such as a first robot 5, a first end effector 6, a second robot 7, a second end effector 8, and additional robots and end effectors not shown in FIG. 1.

Figure 2:
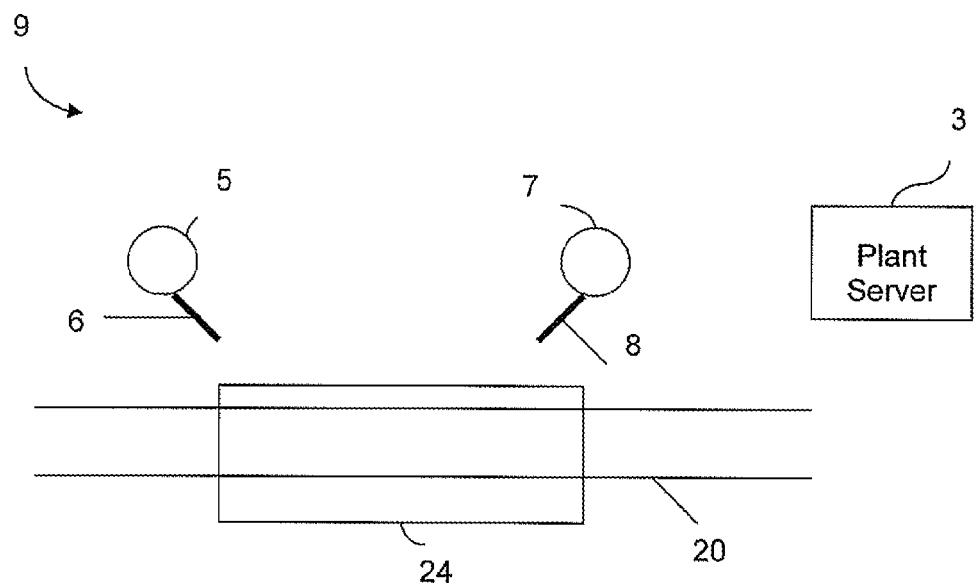
FIG. 2 is a top plan view of an assembly line.

As shown in FIG. 2, a manufacturing plant 9 can include one or more assembly lines 20, each of which has one or more workstations 10 where work pieces (not shown) are processed. The industrial devices, here the first robot 5, its first end effector 6, the second robot 7, and its second end effector 8, can be positioned sufficiently close to the assembly line 20 to process a work piece at the workstation 24. The plant server 3 can also be located within the manufacturing plant 9.

Referring back to FIG. 1, the remote server 2 can be a server including a microprocessor and memory with software stored thereon. The remote server 2 can be located, as examples, at a facility operated by a manufacturer of industrial appliances or at a facility of a company owning multiple manufacturing plants. The remote server 2 can be in communication with the plant server 3 via, for example, the internet. Additionally, the remote server 2 can be in communication with multiple plant servers 3, such as plant servers 3 located at different manufacturing plants. Similarly, more than one remote server 2 can be in communication with a single plant server 3. The memory of the remote server 2 can be loaded with various types of information, such as operational instructions and software updates for one or more industrial appliance. Thus, the remote server 2 can transmit information, such as industrial device software updates and industrial device operating instructions, to the plant server 3. Additionally, the remote server 2 can receive information from each plant server 3. Information received by the remote server 2 from the plant server 3 can be used, as examples, to monitor the efficiency and condition of the industrial appliances.

The plant server 3 can be a server including a microprocessor and memory with software stored thereon. In addition to receiving information from the remote server 2, the plant server 3 can receive information locally, such as by manually entering the information into the plant server 3, by uploading information to the plant server 3 using an information storage device such as a CD-ROM drive or a portable hard-drive, or by transferring information to the plant server 3 from a computer via the LAN 4. The plant server 3 can communicate information to the industrial devices (e.g., the first robot 5, the first end effector 6, the second robot 7, and the second end effector 8) via the LAN 4 as is discussed below in greater detail.

The LAN 4 can include, as examples, one or more wireless routers for communication based on IEEE standard 802.11 (also known as Wi-Fi) and/or components such as hubs, routers, switches, bridges, and wires for communication based on IEEE standard 802.3 (also known as Ethernet). The LAN 4 can enable communication from the plant server 3 to the industrial devices, such as the first robot 5, first end effector 6, second robot 7, and second end effector 8 as shown in FIG. 1. Also, instead of the LAN 4, another type of communication system can be used for communication between the plant server 3 and the industrial devices, such as a CAN (Campus Area Network) if, for example, the manufacturing plants 9 of sufficient size to warrant the use of the CAN.

Figure 3:
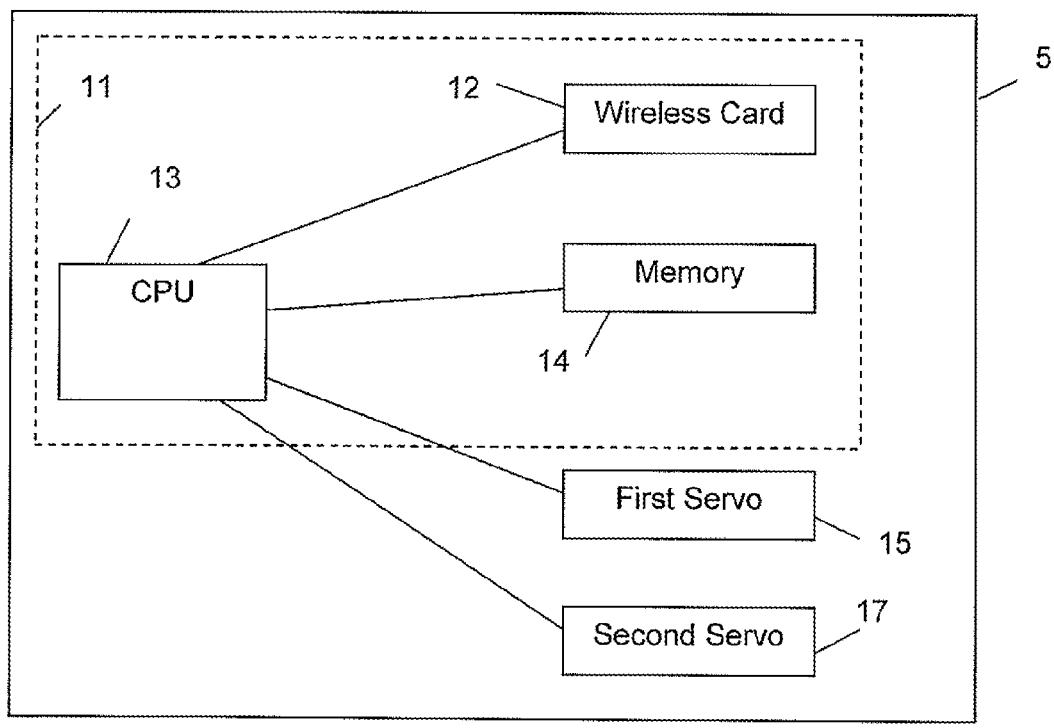
FIG. 3 is a schematic view of a robot.

As shown in FIG. 3, the first robot 5 can include a robot control system 11, which can be coupled directly to the robot 5 (e.g., to a base, an arm, or a wrist of the robot 5) or can be disposed adjacent the robot 5. The robot control system 11 can include a wireless card 12 for communication with the plant server 3 via the LAN 4. The robot control system (RCS) 11 can alternatively include another type of network interface card (NIC), such as an Ethernet card, depending on the configuration of the LAN 4. The wireless card 12 can be in communication with a CPU 13 for transmitting information received from the plant server 3 to the CPU 13. The CPU 13 can be a microprocessor, and the CPU 13 can be in communication with a memory 14. The memory 14 can be RAM, ROM, a hard-drive, or another type of memory. The CPU 13 can communicate information received from the wireless card 12 to the memory 14 for storage thereon. Additionally, the CPU 13 can retrieve information stored on the memory 14, and the CPU 13 can execute software stored on the memory 14. For example, the CPU 13 can execute a robot control program stored on the memory 14 and including instructions for controlling the robot 5 to move the end effector 6 into a predetermined position or along a predetermined path. Further, the RCS 11 can use its wireless card 12 to communicate with other devices, such as other industrial appliances, via the LAN 4.

Still referring to FIG. 3, the robot 5 can additionally include at least one servo, such as a first servo 15 and a second servo 17, for generating forces that move the robot 5. For example, activation of the first servo 15 can cause rotation of the robot 5 about its base, while activation of the second servo 17 can cause rotation of a wrist of the robot 5 relative to an arm of the robot 5. The CPU 13 of the RCS 11 can be in communication the servos 15 and 17. As a result, the RCS 11 can control the servos 15 and 17, thereby controlling movement of the robot 5. Additional servos can be included for additional movement of the robot 5 (e.g., the robot 5 can have six degrees of freedom and can have six servos, one corresponding to each degree of freedom), and the RCS 11 can be in communication with the additional servos to control operation of the additional servos. Further, the RCS 11 can be in communication with additional components not shown in FIG. 3, such as one or more sensors for detecting the position of the first robot 5. The second robot 7 can also include one of the RCSs 11 and at least one servo, such as servos 15.

Figure 4:
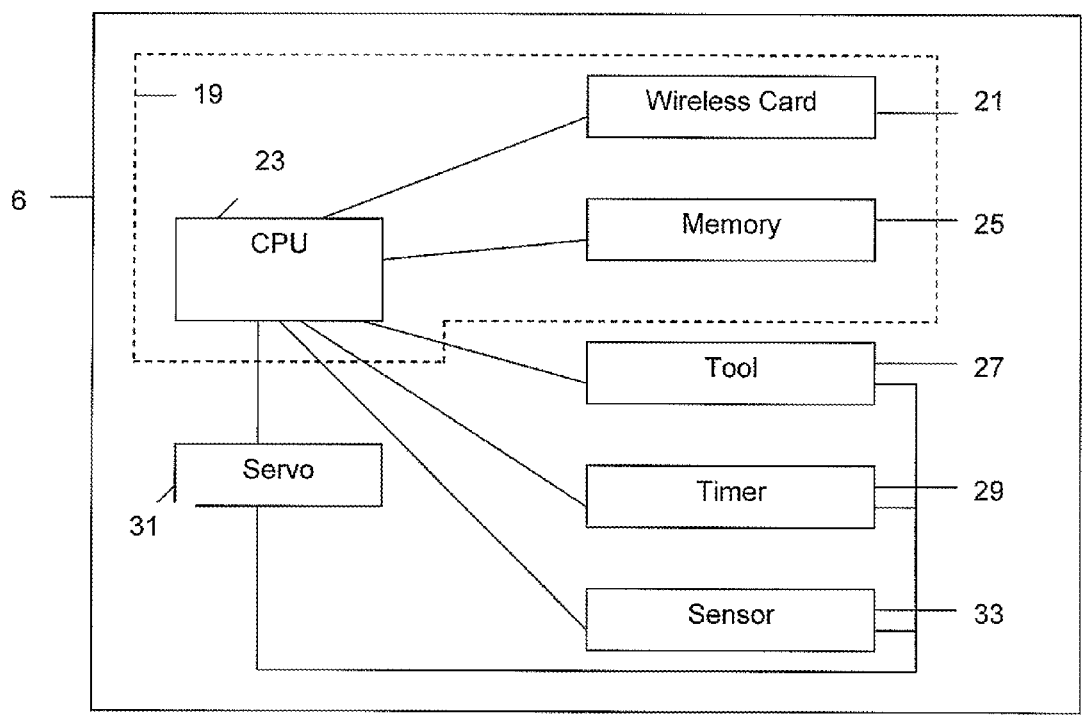
FIG. 4 is a schematic view of an end effector.

As shown in FIG. 4, the first end effector 6 can include an end effector control system (EECS) 19. The first end effector 6 and the EECS 19 can be packaged together such that they form an integral unit. As example, the EECS 19 can be installed in a housing on an exterior of the end effector 6, or the EECS 19 can be housed within an exterior casing of the end effector 6. The EECS 19 can include a wireless card 21 for communication with the plant server 3 via the LAN 4. The EECS 19 can alternatively include another type of network interface card (NIC), such as an Ethernet card, depending on the configuration of the LAN 4. The wireless card 21 can be in communication with a CPU 23 for transmitting information received from the plant server 3 to the CPU 23. The CPU 23 can be a microprocessor, and the CPU 23 can be in communication with a memory 25. The memory 25 can be RAM, ROM, a hard-drive, or another type of memory. The CPU 23 can communicate information received from the wireless card 21 to the memory 25 for storage thereon. Additionally, the CPU 23 can retrieve information stored on the memory 25, and the CPU 23 can run software stored on the memory 25. For example, the CPU 23 can execute an end effector control program stored on the memory 25 and including instructions for controlling the end effector 6. Further, the EECS 19 can communicate with other industrial devices, such as the RCS 11, via the LAN 4.

Still referring to FIG. 4, the first end effector 6 can additionally include a tool 27. The tool 27 can be a device for operating on a work piece, such as a welding gun, a clamp, an adhesive applicator, a paint sprayer, or a stud welder. The EECS 19 can be in communication with the tool 27 to control the operation of the tool 27. The first end effector 6 can also include other components, such as one or more of a timer 29 for determining the duration of time that the tool 27 operates (alternatively, the CPU 23 can perform a timing function), one or more servos 31 for moving or actuating the tool 27, and one or more sensors 33 for detecting the operation of the tool 27. Depending on the type of tool 27, the sensor 33 can detect whether the tool 27 is in an "on" state or an "off" state, the progress of the tool 27 in performing an operation, the efficiency of the tool 27, and/or another status of the tool 27. Each of the timer 29, servo 31 and sensor 33 can be in communication with the CPU 23, and the CPU 23 can actuate the servo 31 to control the tool 27 in response to the end effector control program with input from the timer 29 and sensor 33. Depending on the type of tool 27, another tool actuating device can be included instead of or in addition to the servo 31. For example, a pneumatic device, a motor, a valve, and/or an electrical circuit for activating the tool 27 can be included instead of or in addition to the servo 31. The second end effector 8 can also include one of the EECSs 19 and other components such as the tool 27, timer 29, servo 31 and/or sensor 33.

Due to the inclusion of the EECS 19, as well as any of the timer 29, servo 31 and sensor 33 that are included, the first end effector 6 can be a self-contained unit that can control its own function. The end effector 6 can thus rely on the first robot 5 solely for positioning the end effector 6. The end effector 6 need not necessarily receive a control signal originating from a controller that also controls the robot 5. That is, separate and independently functioning control systems, the RCS 11 and the EECS 19 in the examples shown in FIGS. 2 and 3, can control the first robot 5 and the first end effector 6 carried by the first robot 5, respectively. Though the operation of the EECS 19 can be independent of the RCS 11 and the end effector 6 can rely on the robot 5 solely for positioning, it is also possible for the EECS 19 and RCS 11 to communicate with each other via the LAN 4 as mentioned above. For example, the RCS 11 can communicate the position of the robot 5 and/or end effector 6 to the EECS 19, which can take the position of the robot 5 and/or end effector 6 into consideration when controlling the tool 27. Further, the RCS 11 and EECS 19 of the first robot 5 and first end effector 6 can communicate with industrial devices other than each other, such as the RCS 11 and EECS 19 of the second robot 7 and second end effector 8. As a result, the RCS 11 and EECS 19 of the second robot 7 and second end effector 8, respectively, can control their respective industrial appliances based on input receives from the RCS 11 and/or EECS 19 of the first robot 5 and first end effector 6, respectively.

Additionally, the plant server 3 can update software and operating instructions, among other information, on the memory 14 of the RCS 11 and the memory 25 of the EECS 19 by communicating with the RCS 11 and EECS 19 via the LAN 4. The plant server 3 can communicate independently with the each RCS 11 and EECS 19. Thus, different industrial devices can be updated or receive new operating instructions independently from other industrial devices, though different updates and new information can be transferred simultaneously to multiple industrial devices. Communication between the plant server 3 and the robots 5 and 7 and end effectors 6 and 8 can be beneficial for multiple reasons. For example, new operating instructions can be provided if the assembly line 20 is reconfigured, such as by changing the operations performed by the robots 5 and 7 or their end effectors 6 and 8, respectively, to process a different type of work piece. As another example, instructions can be updated if a bug is discovered in a previous version of the instructions, or if one of the robots, robot 5 for example, malfunctions and an adjacent robot, robot 8 for example, can be reconfigured to perform the same operation via a robot control program update and/or end effector change.

Updating instructions on the robots 5 and 7 and/or end effectors 6 and 8 via the LAN 4 can also increase the efficiency of the manufacturing plant 9. For example, the end effector 6 can be programmed to perform a certain operation prior to installation on the robot 5, such as if the end effector 6 is replacing a previous end effector. The end effector 6 can be reprogrammed while being transported to the robot 5 on an automated guided vehicle, or while in a storage facility. Thus, once the end effector 6 is installed, the robot 5 and end effector 6 can begin performing operations. Additionally, have the server 3 with the ability to control all robots 5 and 7 and end effectors 6 and 8 can increase the efficiency of the assembly line 9 because all controls can be accessed from a single location (i.e., the server 3).

Figure 5:
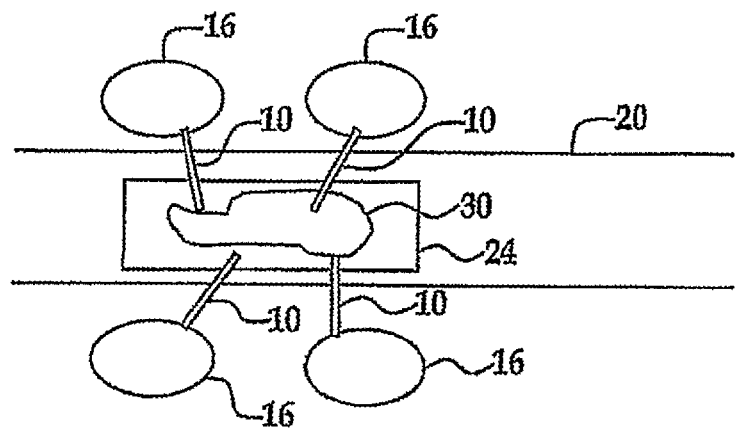
FIG. 5 is a simplified schematic plan view of a manufacturing or assembly line.

Additional and alternate examples of a robotic end effector system 1 and method are shown in FIGS. 5-18. Referring to FIG. 5, the inventive system and method is generally useful in a manufacturing and assembly facility or plant having mechanical robots 16 (or 5)(four robots shown) each having an end effector 10 positioned along a manufacturing and/or assembly line 20, and most useful positioned adjacent a workstation 24 where workpieces 30 are transferred to and positioned for further processing such as clamping, bonding, welding, sealing, painting or other processing known by those skilled in the art.

Figure 6:
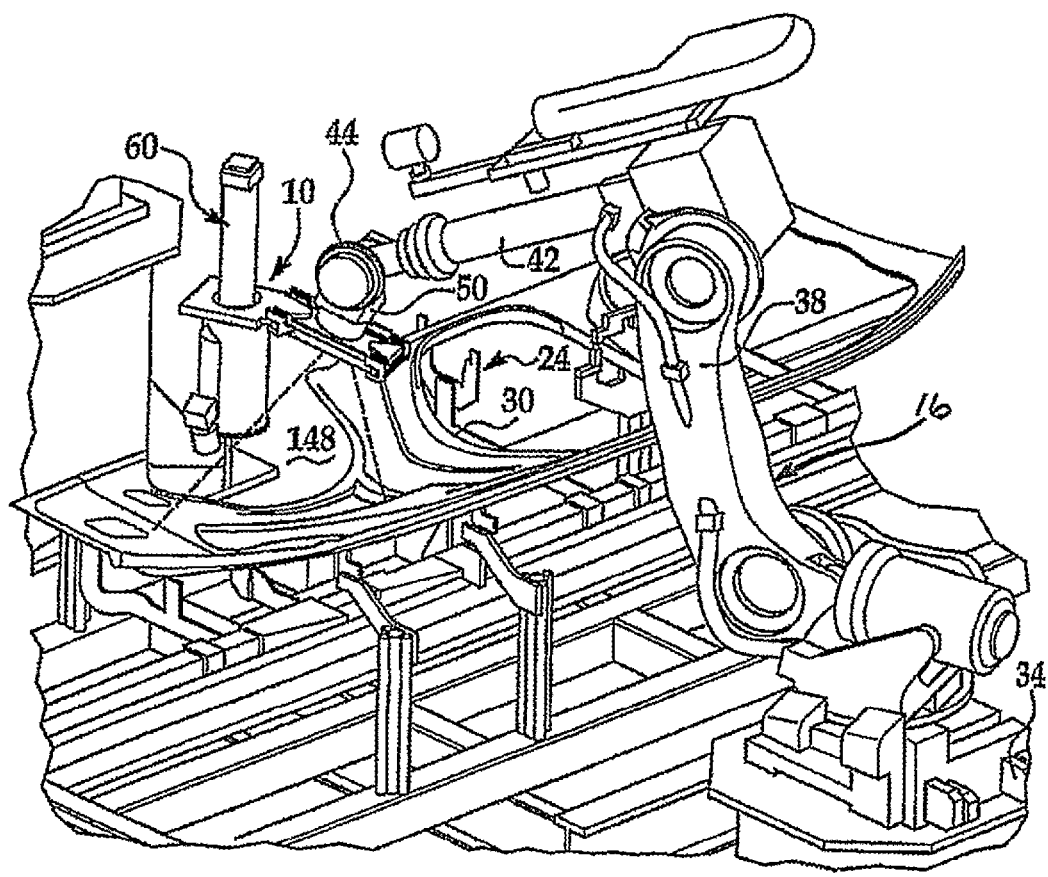
FIG. 6 is a perspective view of an example of the inventive end effector system in an exemplary application as a fluid applying robot at a workstation along the assembly line of FIG. 1.

In one example shown in FIG. 6, end effector 10 is in the form of an end effector for applying a fluid, for example an adhesive or sealant to a workpiece 30, for example automobile sheet metal body components using a robot 16. In the example, robot 16 includes a base 34, a body 38, an armature 42, a wrist 44, servo motors (not shown) and an exemplary end effector 10 in the form of an effector 60 for applying a fluid to workpiece 30 at a workstation 24. The robot 16, including base 34, body 38, armature 42 and wrist 44 is moveable in six degrees of freedom by servo motors and other devices and having other capabilities, movements and functions known by those skilled in the field. In the example shown, robot 16, and more specifically wrist 44 is connected to a connector face plate 50. Face plate 50 is used as a conduit and exit for service lines including electrical, water air and other service fluids and power from robot 16 to end effector 10 described in further detail below. Face plate 50 is useful to attach a selected end effector 10 for various manufacturing and assembly uses described in further detail below.

Referring again to FIG. 6, the robot 16 can include the connector face plate 50 for physical attachment to the end effector 10. The connector face plate 50 can also include a data connection for communication between robot 16 and the end effector 10, such as communication between the robot servos 46 and the end effector controller 54 (see FIG. 9). The connector face plate 50 can receive end effectors 10 other than the adhesive applying end effector 60, such as a welding end effector 66 (see FIG. 13) or clamping end effector 70 (see FIG. 14). Further, the robot 16 can be mounted on a movable platform 34 for mobility relative to the assembly line 20. As a result, the robot 16 can be easily moved to different positions and can be configured to perform different operations, both of which can increase the versatility of the assembly line 20.

Figure 9:
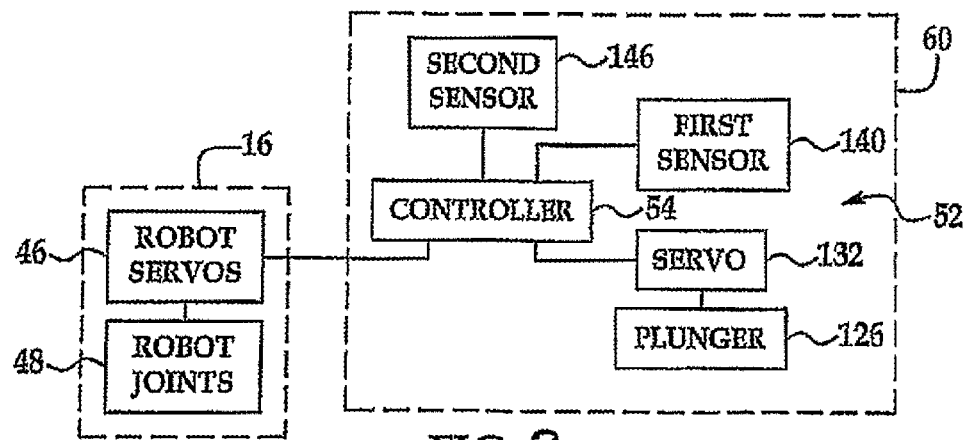
FIG. 9 is a schematic diagram of one example of a robotic and end effector control system for the exemplary application shown in FIG. 6.

Referring to FIG. 9, an exemplary end effector control system 52 for exemplary end effector 60 is shown. A controller 54 is in electronic communication with several components on-board the effector 60 as well as in communication with a separate controller on the robot 16 (not shown). In a preferred example, end effector 10 includes a separate control system that is integral or on-board the effector 10. See U.S. Provisional Application Ser. No. 61/160,893 filed Mar. 17, 2009, assigned to the same assignee herein, which is incorporated by reference in its entirety. In the example effector control system 52, the controller 54 may include a microprocessor and memory storage (not shown). Controller 54 may be in electronic communication with on-board effector 60 (or 10) components, including one or more servo motors 132, a plunger 126 and first and second sensors 140 and 146, respectively described in more detail below. The use of a separate end effector control system 52 which is integral and dedicated to the particular end effector 10 allows the end effector 10 to communicate and carry-out end effector tasks or applications that are specifically designed or programmed for that particular end effector 10. On changing of the end effector 10 by robot 16, the effector control system 52 is placed in communication with robot 16 control system (not shown) and/or local or remote servers that provide programs, instructions and/or downloads of information and instructions for the alternate and installed end effector 10 allowing robot 16 to be quickly retasked, for example, to a different vehicle body or other device to be manufactured and assembled.

Figure 7:
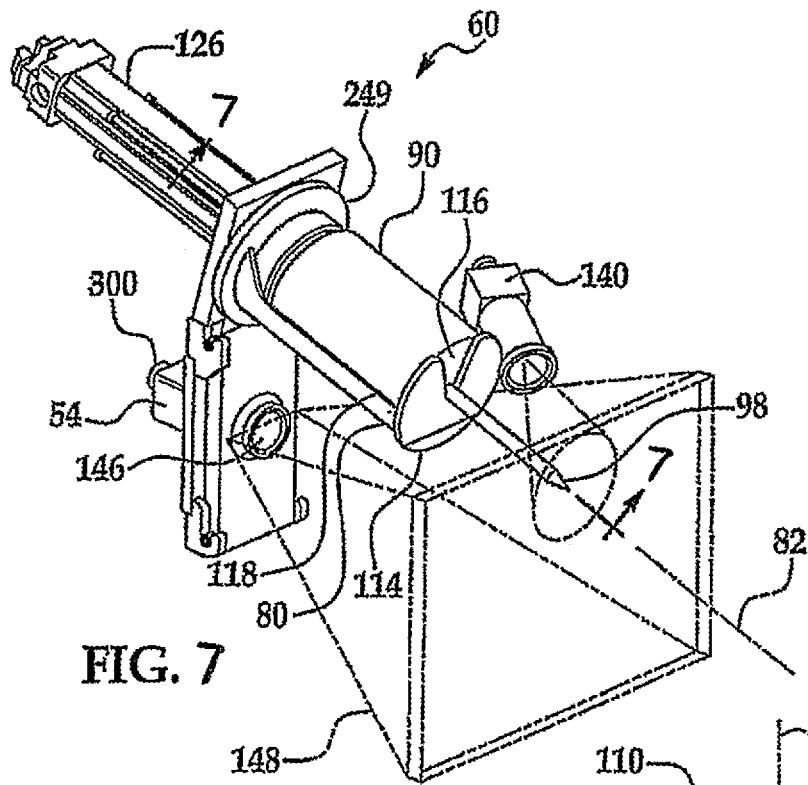
FIG. 7 is a perspective view of an example of an adhesive applying end effector generally illustrated in FIG. 6.
Figure 8:
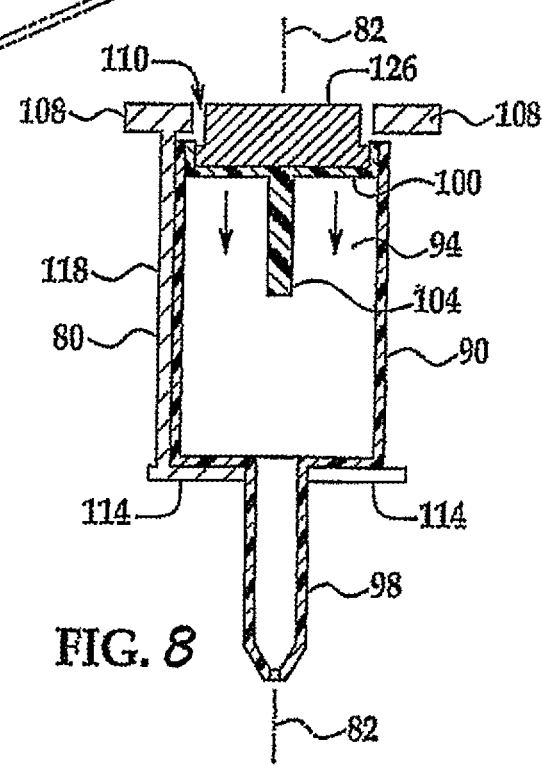
FIG. 8 is a cross-section taken along line 7[ ]-7[ ] in FIG. 3.

An example of an end effector 10 in the form of the end effector 60 useful for applying a fluid, for example an adhesive or sealant, is shown in FIGS. 6, 7 and 8. In the example, adhesive end effector 60 may include a receptacle 80 having a longitudinal axis 82 sized to receive a fluid canister 90. The fluid canister 90 can enclose a chamber 94 that can contain an adhesive or another fluid (not shown) known by those skilled in the field. The canister 90 can include a nozzle 98 in fluid communication with the chamber 94. The canister 90 can also include a slidable backing plate 100. The backing plate 100 can have an outer diameter substantially the same as the inner diameter of the canister 90 such that the backing plate 100 seals the end of the chamber 94 opposite the nozzle 98. The backing plate 100 can include a needle 104 extending toward the nozzle 98 along the longitudinal axis 82. The needle 104 preferably includes an outer diameter slightly larger than an inner diameter of the nozzle 98, and the needle 104 can have a length slightly less than a length of the nozzle 98. Movement of the backing plate 100 toward the nozzle 98 reduces the volume of the chamber 94, thereby forcing fluid from the canister 90 via the nozzle 98 in the form of a fluid bead (not shown). The fluid bead may take the form of a thin, continuous cylinder or any other cross-sectional shape defined by the nozzle 98.

The fit between the backing plate 100 and interior diameter of the canister 90 can be sufficiently tight such that the backing plate 100 scrapes fluid from interior walls of canister 90. As a result, only a small amount of fluid can remain in the canister 90 after the backing plate 100 is fully depressed, and the effort required to clean the canister 90 can be reduced. Further, the fit between the needle 104 and the nozzle 98 can be sufficiently tight such that the needle 104 scrapes fluid from interior walls of the nozzle 98. As a result, the effort required to clean the portion of the nozzle 98 scraped by the needle 104 can be greatly reduced.

Referring to FIGS. 7 and 8, the receptacle 80 can have two opposing end-walls 108 and 114 spaced apart by the length of the canister 90. The length of receptacle 80 may be longer and in a preferred example, includes a semicircular or otherwise trough-shaped portion 118 between the end-walls 108 and 114. The end-wall 108 can define an aperture 110. The end-wall 114 can include a generally V-shaped cutout 116 through which the nozzle 98 of the canister 90 can project when the canister 90 is received in the receptacle 80. The trough-shaped portion 118 can have an inner circumference with a same or slightly larger diameter than an outer circumference of the canister 90. In an alternate example of a receptacle 80, the end effector 60 can include a different receptacle 80, such as a collar around the end-wall 114 and projecting toward end-wall 108 (not shown), or a pair of clamps (not shown) for engaging the canister 90. Other shapes and orientations of receptacle 80 for use in holding and securing a fluid canister 90 known by those skilled in the field may be used.

In the exemplary adhesive end effector 60, the end effector 60 can also include a plunger 126 and a servo motor 132 (shown schematically in FIG. 9), for actuating the plunger 126 for movement along the longitudinal axis 82. The plunger 126 can have a diameter smaller than the inner diameter of the canister 90, and the plunger 126 can extend through the aperture 110 in the end wall 108. The servo 132 can actuate the plunger 126 to forcibly move the plunger 126 axially along longitudinal axis 82 relative to the canister 90 in response to an instruction from the controller 54 as shown in FIG. 9. Also, the functions described herein as performed by the controller 54 can alternatively be performed by more than one controller packaged with the robot 16 and/or the selected end effector 10 to suit the application. For example, when the canister 90 is initially positioned in the receptacle 80, the servo 132 can move the plunger 126 to a starting position in which the plunger 126 exerts pressure on the backing plate 100 without moving the backing plate 100 by a large amount in order to aid retention of the canister 90 in the receptacle 80. The servo 132 can additionally move the plunger 126 toward the end-wall 114, thereby moving the backing plate 100 toward the end-wall 114, reducing the size of the chamber 94, and causing fluid to flow from the nozzle 98. Also, instead of the servo 132, another device can move the plunger 126, such as another type of motor, pneumatic or hydraulic pistons or devices, motors and gears, or other devices (not shown) known by those skilled in the art.

As shown in FIGS. 6, 7 and 9, end effector 60 (or 10) can include one or more vision or other sensors, for example end effector 60 sensor 140. The sensor 140, in an exemplary use to monitor the existence and/or quality of the fluid bead extruded from nozzle 98, can be an ultrasonic sensor, a camera, or another type of sensor or vision system capable of detecting a bead of fluid exiting nozzle 98 onto work piece 30. The sensor 140 can be oriented to view a bead of fluid applied to the workpiece 30 from the nozzle 98 of the canister 90. For example, the sensor 140 can be coupled to the receptacle 80 and angled to face near the tip of the nozzle 98. The sensor 140 can detect, for example, the width, height, and/or continuity of the bead of fluid. As shown in FIG. 5, the sensor 140 can be in communication with the controller 54 as well as other controllers and onsite or remote controllers and servers. As a result, the sensor 140 can provide feedback as to the quality of the bead of fluid applied to the workpiece 80, and the controller 54 can instruct the servo 132 to control the plunger 126 and the servos 132 and 46 to control the robot 16 based on the bead quality.

The exemplary end effector 60 (or 10) can additionally include a second sensor 146, which can be a camera, an ultrasonic sensor, or another sensors known by those skilled in the field. As shown in FIG. 6, the sensor 146 can capture an image of an area 148 including the workpiece 30. The signal captured by the sensor 146 can be relayed to the controller 54 as shown in FIG. 9, and the controller 54 can analyze the signal to determine the presence and position of the workpiece 30 and/or the type of workpiece 30. The controller 54 can control the plunger servo 132 and the robot servos 46 based on the presence, position, and/or type of the workpiece 30. Thus, multiple different types of workpieces 30 requiring different types of adhesives and/or different patterns of adhesive application can be accommodated.

Figure 10:
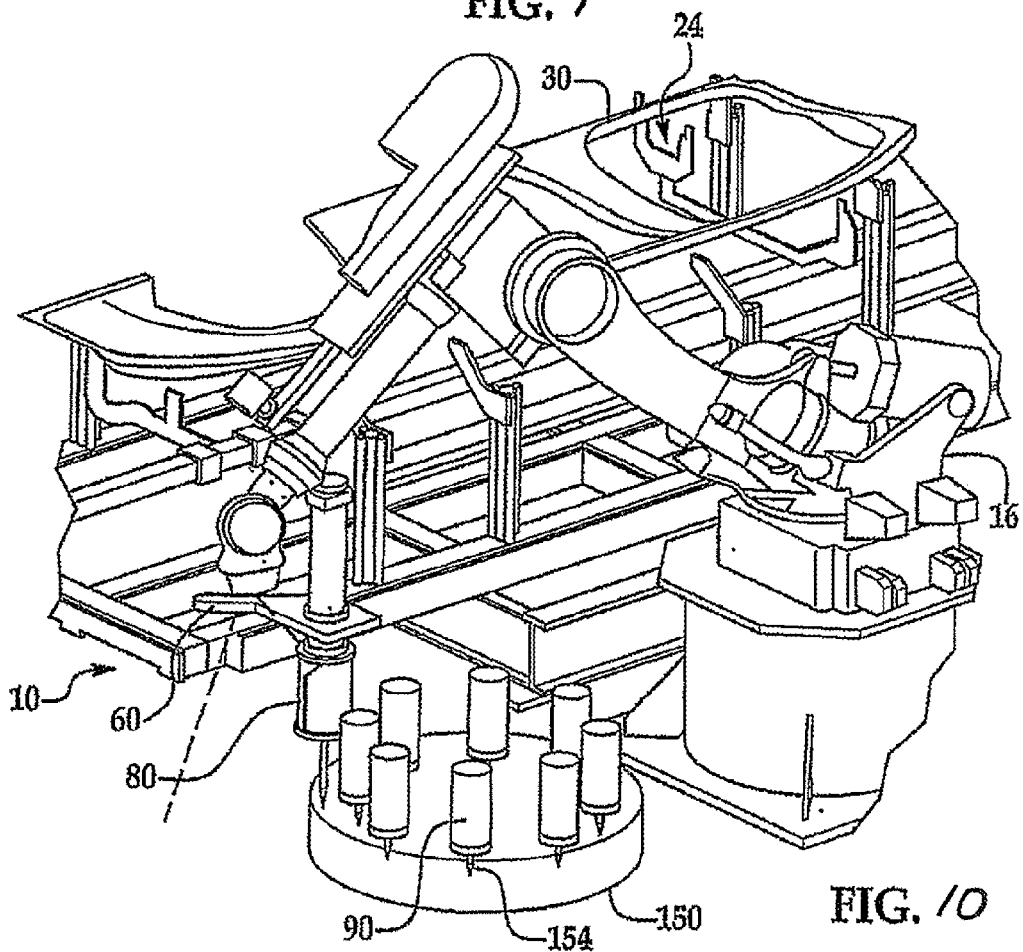
FIG. 10 is a perspective view of the example system shown in FIG. 6 with an example of a fluid tray rack disposed adjacent to the robot.

In a further example of adhesive end effector 60, FIG. 10 shows an exemplary tray or carousel 150 can be disposed adjacent the robot 16. The tray 150 can include canister receiving slots 154, some or all of which can be loaded with additional or alternate canisters 90 containing fluid and some or all of which can be available to receive the canister 90 from the end effector 60. The tray 150 can be mounted on an automation guided vehicle (AGV) (not shown), which can transport the tray 150 between robots 16 and other areas in a manufacturing plant. The controller 54 can determine if a new canister 90 should be loaded into the receptacle 80 in response to, as examples, a low amount of fluid in the canister 90 or the need for another canister 90 containing a different type of fluid. The controller 54 can determine the amount of fluid remaining in the canister 90 held by the receptacle 80 based on, for example, the position of the plunger 126. The controller 54 can instruct the servos 46 and/or 132 to move the robot 16 such that the second sensor 146 is positioned to sense the tray 150. The second sensor 146 can detect the position of canisters 90 on the tray 150 and/or the availability of canister receiving slots 154. The robot 16 can then move the end effector 60 (or 10) to deposit the canister 90 in one of the canister receiving slots 154 and to obtain another canister 90. Fluid canisters 90 can be disposable, one-time use devices, or may be refillable through a refilling station (not shown) for further use. The robot 16 may also be involved in such disposal, refilling and or cleaning of the canisters 90 and effector 10 as the application may require.

As an example of interaction between the end effector 60 and tray 150, each canister receiving slot 154 can include a hole sized to receive the nozzle 98 of one of the canisters 90. The controller 54 can instruct the servos 46 to move the robot 16 such that the end effector 60 is in a position to move vertically to insert the nozzle 98 into the canister receiver slot 154, and the end effector 60 can be controlled to at least partially insert the nozzle 98 into the slot 154. Once the nozzle 98 is at least partially in the slot 154, the controller 54 can instruct the servo 132 to disengage the plunger 126 from the canister 90, and the robot 16 can move the end effector 60 laterally relative to the canister receiving slot 154. Engagement between the nozzle 98 and canister receiving slot 154 can retain the canister 90 in position relative to the canister receiving slot 154 while the receptacle 80 is moved laterally away from the canister receiving slot 150, thereby disengaging the receptacle 80 and canister 90. The canister 90 can then be propelled by gravity into the canister receiving slot 154. The robot 16 can move the empty receptacle 80 into position to engage another canister 90 by laterally moving the receptacle 80 to engage one of the canisters 90 by sliding between the canister 90 and tray 150, then vertically lifting the canister 90 from the tray 150.

Alternatively, new canisters 90 can be loaded into the receptacle 80 in different ways known by those skilled in the field. For example, the end effector 60 can include a canister hopper (not shown) containing a stack of canisters 90. A new canister 90 from the hopper can be released into the receptacle after disposing of the canister 90 previously in the receptacle 80. As another example, canisters 90 can be loaded or unloaded by hand or by use of another robot.

Figure 11:
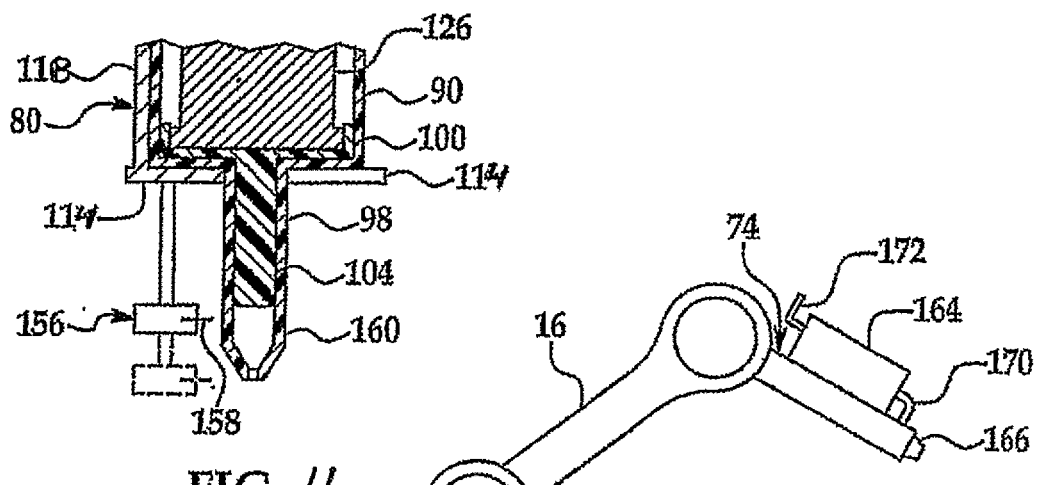
FIG. 11 is a partial and alternate cross-section taken along line 7[ ]-7[ ] in FIG. 3 showing the plunger in a fully extended position and an exemplary cutter in a first position and the cutter in phantom in a second position.

In another example, one of the robot 16 and end effector 60 can also include a cutter 156 as shown in FIG. 11. The cutter 156 can be positioned to remove a tip of the nozzle 98 of the canister 90 in the receptacle 80. For example, the cutter 156 can depend from the end-wall 114 of the receptacle 80. Alternately, cutter 156 could be a stand along device proximate robot 16, tray 150, delivered by an AGV or positioned elsewhere known by those skilled in the art. The cutter 156 can include, for example, a blade 158 movable radially relative to the nozzle 98. Additionally, the cutter 156 can be movable between two positions, a first position in which the cutter 156 is positioned to remove a small portion of the nozzle 98 to create a path for fluid to flow from the nozzle 98 (shown in phantom in FIG. 11) and a second position in which the cutter 156 is positioned to remove a portion 160 of the nozzle 98 not occupied by the needle 104 when the backing plate 100 is fully depressed as shown in FIG. 11. By removing the portion 160 of the nozzle 98 not occupied by the needle 104, the cutter 156 can separate the canister 90 such that the removed portion 160 of the nozzle 98 can be cleaned if necessary to comply with, for example, environmental regulations. The remainder of the canister 90 (i.e., the canister 90 other than the portion 160) can be disposed of without additional cleaning if sufficiently cleaned by the backing plate 100 and its needle 104 as described above. Instead of the cutter 156 being movable, more than one cutter can be included (e.g., a first cutter at the first position and a second cutter at the second position). Other cutting devices other than cutter 156 including an exposed blade, and in different locations and orientations known by those skilled in the art may be used.

Figure 12:
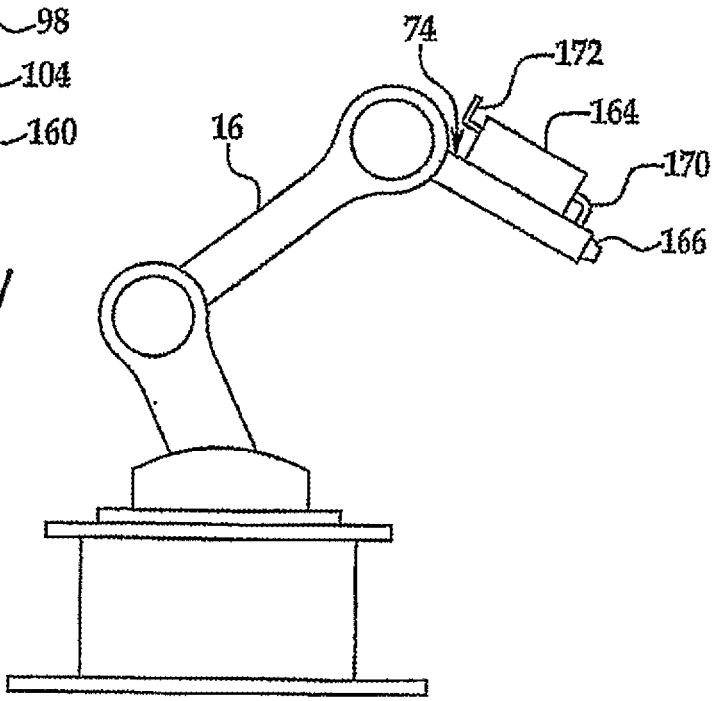
FIG. 12 is a schematic side view of an example of a robot having a stud welding end effector.

In an example of an alternate end effector 10, an effector useful for positioning and securing a weld stud to a workpiece 30 is generally illustrated in FIG. 12. As shown, robot 16 can include a stud welding end effector 74. In one example shown, the end effector 74 can carry a part reservoir 164 and a welding head 166. The part reservoir 164 can be coupled to the welding head 166 via a conduit 170. The part reservoir 164 can be loaded with parts, and the part reservoir can transmit parts to the welding head 166. The studs could be gravity fed or forced down conduit 170 by a vibratory device (not shown) or by other part transfer mechanisms known by those skilled in the art. By carrying the part reservoir 164 on the robot 16, inexpensive and versatile stud welding can be provided. Alternatively, a robot can carry an integral part reservoir.

Figure 13:
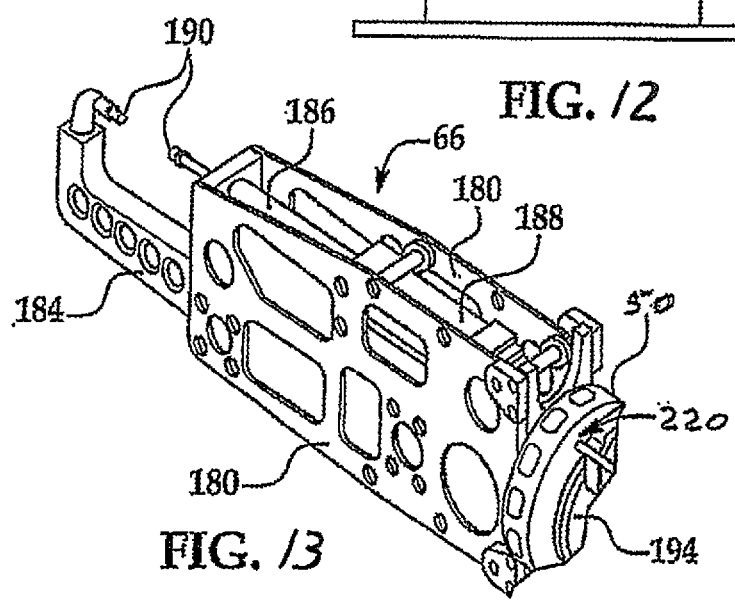
FIG. 13 is a perspective view of an example of a spot welding end effector useful with the robot shown in FIG. 6.

In an alternate example of an end effector 10 useful with robot 16 in the herein described end effector system described is illustrated in FIG. 13. An end effector 66 useful to spot weld two or more sheet metal components is shown. The effector 66 is connectable to robot 16 or wrist 44 through a robot wrist connector face plate 50 and end effector or appliance connector 220 as further described below.

In the example shown in FIG. 13, weld end effector 66 includes sideplates 180, a first weld arm 184, a second weld arm 186 opposing spot welding tips 190 and a power supply 194 to provide electricity to flow through the weld tips. Depending on the particular spot welding application, one or more displacement devices 188 used to move the arms 184 and 186 may be used. Additional components typically used in weld guns, for example a coolant system and other controls (not shown) may be included in the end effector. As described, end effector preferably includes its own on-board control system in communication with other controllers and servers as previously described. Other forms and configurations of weld gun effector 66 known by those skilled in the art may be used.

Figure 14:
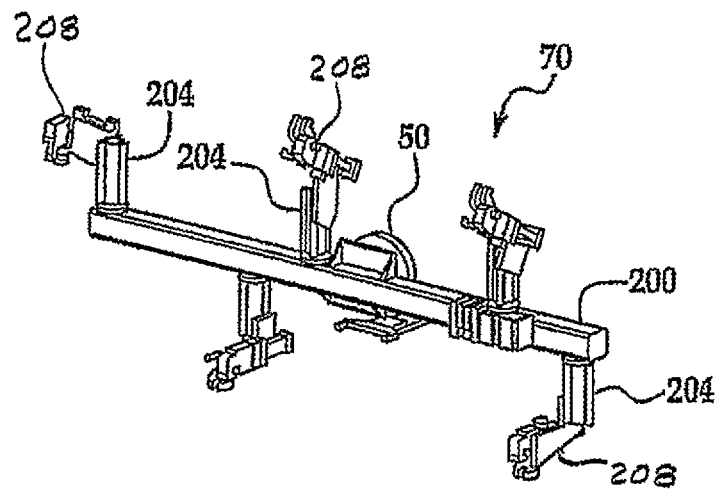
FIG. 14 is a perspective view of an example of a tooling fixture end effector utilizing exemplary clamps for use with the robot shown in FIG. 6.

In an alternate example of an end effector 10 useful with robot 16 in the herein described end effector system is illustrated in FIG. 14. An end effector 70 used as a positional and clamping fixture or tool is illustrated. In the example, end effector 70 includes a support or rail 200, several pedestals 204 connected to support 200, and clamps or clamping fixtures 208 connected to the pedestals 204 to position the clamps 208 in the desired position so as to properly position the workpieces 30 (not shown) in the desired location. Other devices commonly used with clamping tooling or fixtures such as pneumatic or hydraulic actuators (not shown) to open and close the clamps 208, as well as other components known by those skilled in the art may be used.

Although several alternate examples of end effectors 10 have been illustrated and described, other end effectors 10 known by those skilled in the art are useful in the inventive system and method. For example, instead of spot weld gun effector 66, a laser or other seam or bead welding device may be used. As an alternate to an alternate adhesive or sealant effector 60, a paint or other surface coating, or part cleaning fluid applying effectors may be used. Alternate fluids, for example compressed air or lubricating oils or fluids may be used.

Figure 15:
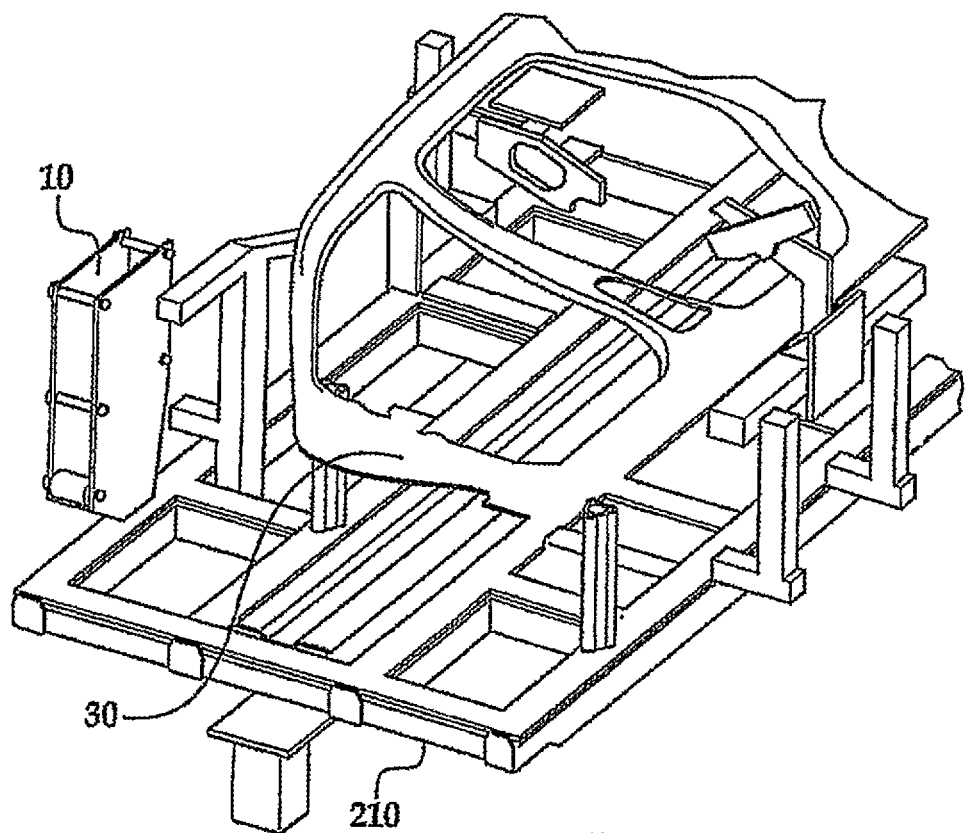
FIG. 15 is a perspective view of an example showing two alternate end effectors temporarily stored on an automatic guided vehicle along with the workpieces to be processed once positioned at a workstation.

Referring to FIG. 15, an example of a use of the inventive end effector system is illustrated. Since the particular end effector 10 may be quickly changed and/or installed on any common robot with the appropriate connectors face plate 50 and/or 300, the particular end effectors 10 that are needed for particular parts or operations may travel or be transferred along with the components themselves as they travel down an assembly line 20 (see FIG. 1) to a workstation 24 where the components are to be processed. FIG. 15 illustrates an alternate effector temporarily stored or attached to a transfer pallet 210 or other support for transferring workpiece 30 between workstations. The pallet 210 can be supported and transferred by an automated guided vehicle (AGV) or other transfer device such as a conveyor, overhead gantry conveyor and other such systems known by those skilled in the art. When the workpieces 30 arrive at the workstation 24 for processing, one or more robots 16 can pick up the applicable end effector 10, establish electronic communication with its on-board controller 54 with the robot and/or other controllers, receive or execute instructions by its controller 54 and carryout the particular and required processing step or operation, for example, applying adhesive, welding or clamping one or more workpieces 30 together for additional processing.

Figure 16:
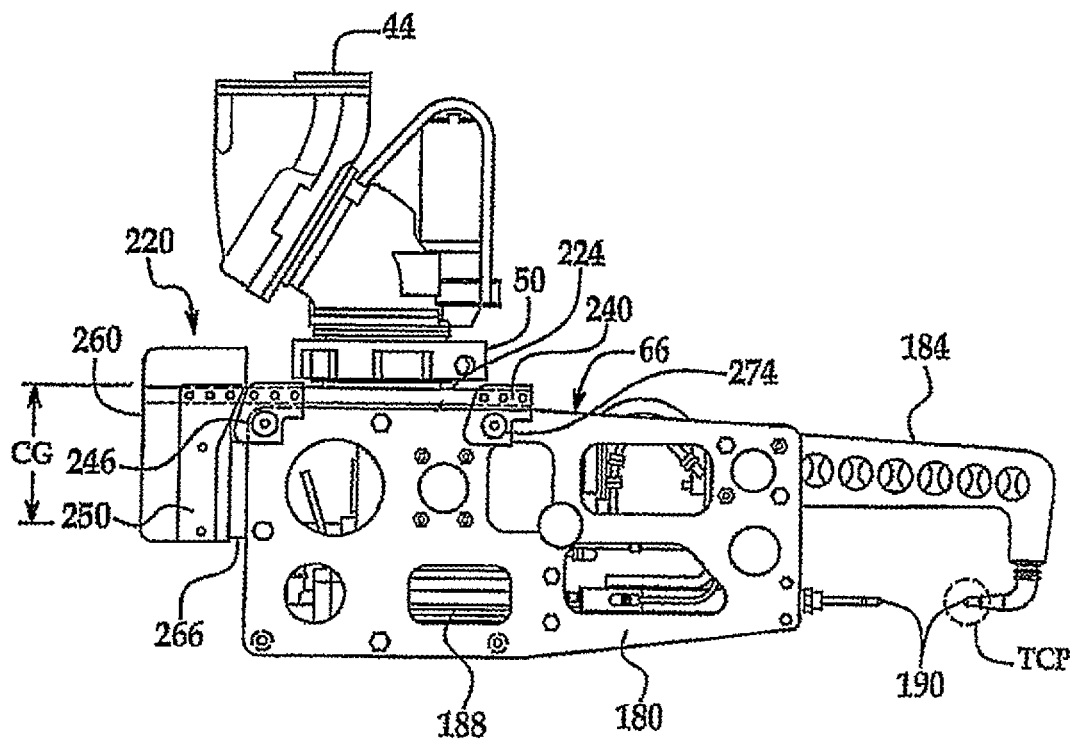
FIG. 16 is a side view of an example of an end effector connector in an exemplary use with a weld gun end effector.
Figure 17:
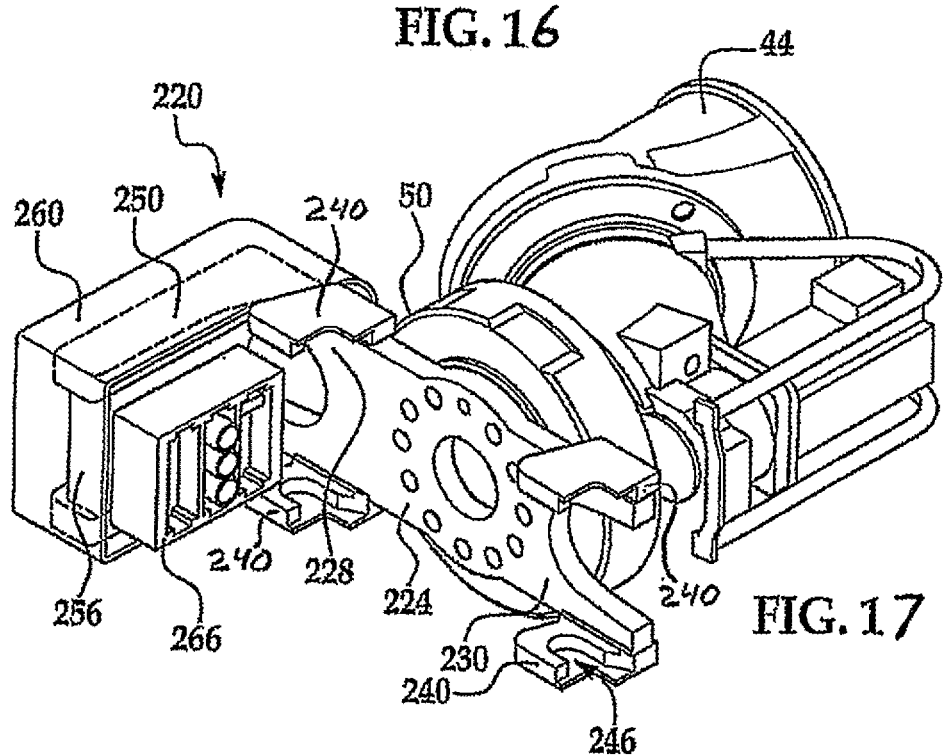
FIG. 17 is a perspective view of a portion of the end effector connector shown in FIG. 16 without the weld gun end effector.
Figure 18:
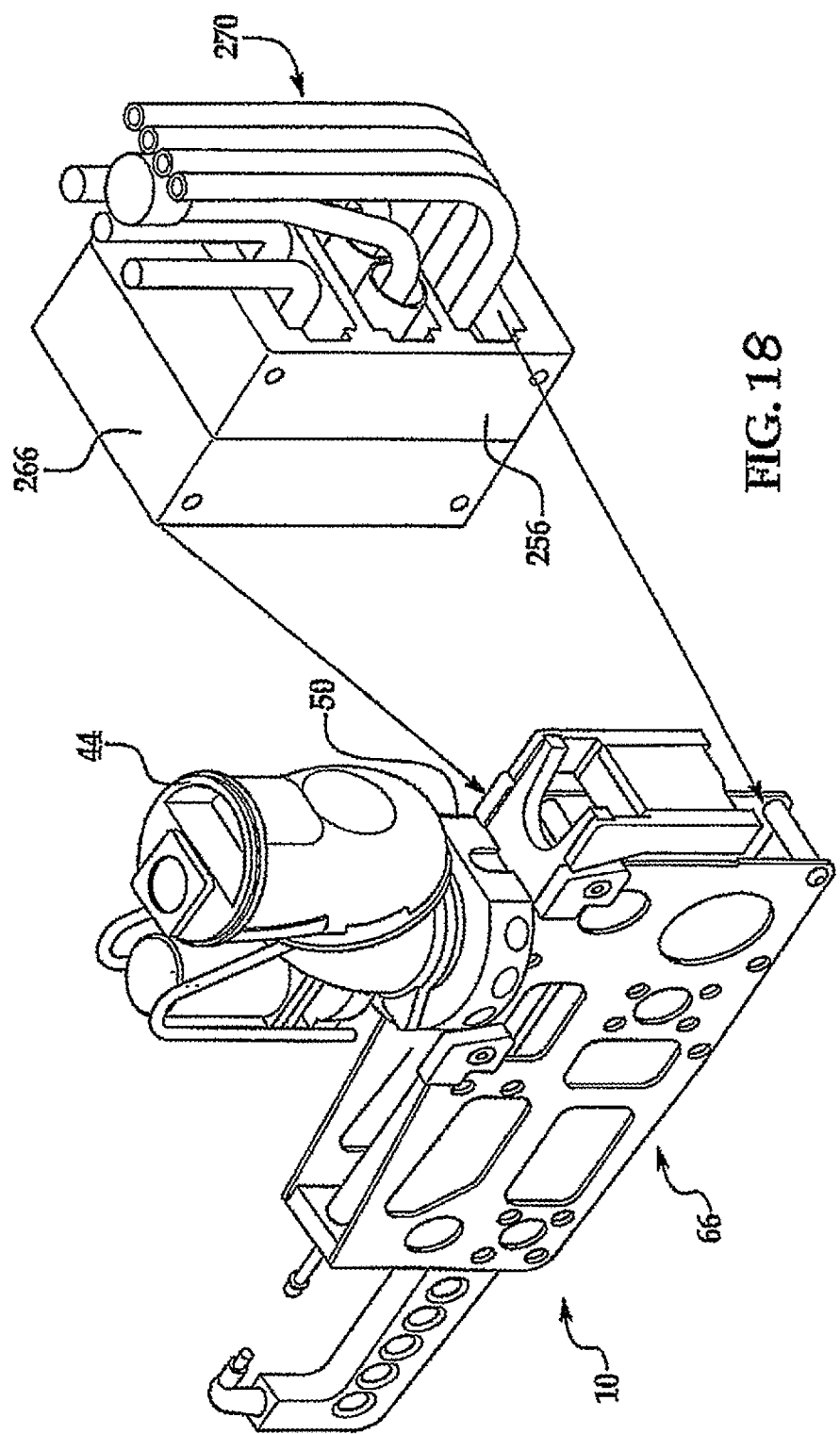
FIG. 18 is a perspective view of the end effector connector shown in FIG. 16 with enlarged view of a portion of the connector.

Referring to FIGS. 16-18 an example of an end effector or appliance connector 220 is illustrated. The appliance connector 220 is shown in an exemplary use in connecting a weld gun effector 66 as described above and the connection detailed below. Other end effectors 10 may be operably connected to robot 16 through connector 220.

As best seen in FIG. 17, connector 220 may include a plate 224 that is rigidly connected to robot wrist face plate 50 though mechanical fasteners or other means known by those skilled in the field. In the example, plate 224 includes a first end 228 and a second end 230. Each end includes several brackets 240 (four shown) rigidly connected to plate 224. Each bracket defines a slot 246 all opening to the same direction (to the right as shown in FIG. 13).

In the example, connector 220 may further include an angle bracket 250 that connects to one end of plate 224 (to first end 228 in the example). Attached to bracket 250 is socket 256 which, as best seen in FIG. 14, receives service lines 270 from the robot 16 through wrist 44 and face plate 50. Service lines 270 may include hoses or rigid lines to transfer or communicate services, for example electric power, data communication, water or other conditioning fluid, compressed air and other services needed by the end effector 10 to function for the particular application. In a preferred example, a protective cover 260 is used to cover the socket 256 and service lines 270 as they enter the socket 256.

In the example illustrated, connector system 220 further includes a plug 266 preferably affixed to the appliance or end effector 10, a weld gun end effector 66 in the illustrations. Plug 266 provides the appropriate service lines (not shown) needed into the end effector 10 (shown as 66 for illustrative purposes only). As best seen in FIG. 17 (although shown detached from end effector 66), plug 266 includes corresponding male prongs (not shown) or other communication plugs or ports that coincide with the plugs or ports in socket 256 for the effective transfer of the service lines 270 from the robot 16 to the end effector 10 to suit the particular application.

An advantage of connector 220 over prior designs is its ability to substantially maintain or only minimally alter the center of gravity (CG) and tool center point (TCP) of an end effector 10 (illustrated as effector 66) while permitting all of the advantages described herein and as known by those skilled in the art. This is advantageous as relatively little or no reprogramming, readjustment or other modifications is required to change end effector 10 as described herein.

It is understood that connector 220 may be attached to other parts of end effector 66 (or 10) other than in the position shown in FIG. 12 (to the top of end effector 66). Other connection points to the effector 10 to suit the particular application may be used. It is also understood that different components and configurations of the connection and interface points between the plate 224 and end effector 66 other than the specific plug and socket arrangements may be used without deviating from the present invention.

Although connector 220 is shown with a weld gun end effector 66, connector 220 is useable with other end effectors 10 described herein and known by those skilled in the field. Further, connection schemes other than studs 274 into bracket slots 246 may be used as known by those skilled in the field. For example, other quick connect fasteners or temporary locking systems may be used to securely attach end effector 10 to robot 16 while allowing relatively quick release to change the end effector.

In operation to connect an appliance or end effector 10 to robot 16, an appliance or end effector 10 is selected to suit the particular process or operation needed on work pieces 30 in a workstation 24. The end effector, for example weld gun effector 66 includes studs 274 protruding outwardly and oriented so as to slide into slots 246 in brackets 240 as best seen in FIGS. 16 and 18. Socket 256 and coinciding plug 266 are oriented so as to engage on seating of the studs 274 into slots 246 for a positive locking engagement between the robot 16 and the end effector 10 thereby establishing communication of service lines between the robot 16 and end effector 10. The end effector controller 54 is then placed in electronic and data communication with one or more controllers on the robot or other local or remote servers to receive additional programming or instructions, or is simply activated through on-board sensors and/or programs resident in its controller to begin the operation. As each end effector preferably includes its own controller, relatively little or no reprogramming, adjustment or other modifications are typically needed. When a change of end effector 10 is desired, the end effector 10 may be readily removed from connector 220 thereby sealingly severing the service lines 270 and terminating communication of controller 54 with the other controllers or servers. This allows robot 16 far greater versatility over prior end effector designs and connector systems which in effect, dedicated a robot to a specific task unless significant time and investment were expended to reconfigure, reprogram and re-equip the robot to serve an alternate task.

The above-described examples have been described in order to allow easy understanding of the invention and do not limit the invention. On the contrary, the invention is intended to cover various modifications and equivalent arrangements, whose scope is to be accorded the broadest interpretation so as to encompass all such modifications and equivalent structure as is permitted under the law.

What is claimed is:

1. A programmable robotic end effector apparatus for use with a multi-axis robot having a wrist, the end effector comprising:
    a housing;
    a connector connected to the housing, the connector selectively and removably engageable with a robot wrist;
    an end effector control unit connected to the housing, the end effector control unit further comprising:
        a processor;
        a memory storage device;
        end effector programmed operating instructions stored in the end effector memory storage device, the end effector operating instructions operable to control an end effector tool to perform a predetermined assembly operation on a workpiece;
        robot programmed operating instructions stored in the end effector memory storage device, the robot operating instructions operable to control an operation of the robot;
        an electronic communication device operable to establish communication between the end effector control unit and the robot and to send the robot programmed operating instructions to a robot control unit for execution of the robot programmed operating instructions by the robot; and
    a tool connected to the housing, the tool having an actuator in electronic communication with the end effector control unit, the tool operable to execute the end effector programmed operating instructions to perform the predetermined assembly operation on the workpiece.

2. The end effector of claim 1 wherein the electronic communication device comprises a network interface device configured to communicate data between the end effector and at least one of the robot, an assembly plant communication network, an assembly plant server or another programmable end effector.

3. The end effector of claim 2 wherein the network interface device comprises at least one of a wireless communication card or a network interface card (NIC).

4. The end effector of claim 1 further comprising:
at least one service line; and
the connector further comprising at least one of a socket or a plug for engaging receipt of a reciprocal plug or socket connected to at least one service line connected to the robot.

5. The end effector of claim 1 wherein the tool comprises a resistance spot welding gun, the end effector further comprises:
a displacement device for selective movement of at least one weld arm;
a power supply device for selective supply of electrical current to a weld arm electrode; and
a fluid supply device for selective supply of fluid to at least one weld arm.

6. The end effector of claim 1 wherein the tool comprises a fluid application device, the end effector further comprises:
a fluid reservoir for temporary storage of a fluid to be dispensed by a tool fluid dispensing end; and
a fluid supply device for selective movement of fluid from the fluid reservoir toward the tool fluid dispensing end.

7. The end effector of claim 6 wherein the fluid reservoir comprises a disposable fluid cartridge removably positioned on the end effector, the fluid supply device further comprises a servo motor and a plunger, the plunger operable to force fluid from the disposable cartridge toward the tool fluid dispensing end.

8. The end effector of claim 6 further comprising a sensor in communication with the end effector control unit.

9. The end effector of claim 8 wherein the sensor comprises a vision device having an image taking apparatus for visually inspecting fluid dispensed from the tool fluid dispensing end.

10. A method of controlling a robotic end effector tool for use in conducting work on a workpiece, the method comprising the steps of:
an end effector control unit receiving programmed end effector operation instructions for at least one predetermined end effector tool physical assembly operation;
the end effector control unit receiving programmed operation instructions to control a multi-axis robot engaged with the end effector tool;
the end effector control unit storing the end effector and robot operation instructions in a memory storage device in communication with the end effector control unit;
removably engaging the end effector tool to a multi-axis robot wrist;
accessing the stored end effector and robot operation instructions from the memory storage device;
executing the stored end effector and robot operation instructions for the predetermined tool physical assembly operation; and
performing the physical assembly operation by the end effector tool.

11. The method of claim 10 further comprising the steps of:
establishing electronic communication between the end effector control unit and a robot control unit, the electronic communication including at least digital data communication;
transferring the stored robot operating instructions from the end effector memory storage device to the robot control unit; and
performing at least one physical operation by the robot according to the transferred robot operating instructions.

12. The method of claim 11 wherein the step of establishing electronic communication between the end effector control unit and the robot control unit occurring on physical engagement of the end effector to the robot wrist.

13. The method of claim 11 wherein the step of robot performing at least one physical operation by the robot according to the transferred robot operating instructions comprises:
the robot positioning the robot wrist in three dimensional coordinate space to position an end effector tool center point (TCP) of the end effector tool at a predetermined three dimensional coordinate position for the performing the physical assembly operation by the tool.

14. The method of claim 10 wherein the step of removably engaging the end effector tool to the robot wrist further comprises the step of:
automatically connecting at least one service line connected to the robot with a coordinating service line connected to the end effector tool.

15. The method of claim 14 further comprising the step of:
selectively activating the at least one service line for communication of at least one of an electrical current or a fluid between the robot service line and the end effector service line to perform the end effector tool physical assembly operation.

16. The method of claim 15 wherein the step of selectively activating the at least one service line further comprises the steps of:
transferring stored operation instructions from the end effector memory storage device to a service line apparatus control device.

17. The method of claim 10 wherein the step of removably engaging the end effector tool to the robot wrist further comprises the steps of:
wirelessly transferring robot operation instructions to the robot control unit from the end effector control unit;
executing the transferred operation instructions by the robot to move the robot wrist to a predetermined three dimensional coordinate position where an end effector connector plate is positioned; and
establishing physical contact between the robot wrist and end effector connector plate to physically engage the end effector to the robot wrist.

* * * * *